US010184226B2

(12) United States Patent
Parzynski, Jr. et al.

(10) Patent No.: US 10,184,226 B2
(45) Date of Patent: Jan. 22, 2019

(54) SERRATED CUTTING EDGE WITH CERAMIC INSERT

(71) Applicant: Caterpillar Inc., Peoria, IL (US)

(72) Inventors: David Bruno Parzynski, Jr., Peoria, IL (US); Thomas Marshall Congdon, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/380,607

(22) Filed: Dec. 15, 2016

(65) Prior Publication Data

US 2018/0171587 A1 Jun. 21, 2018

(51) Int. Cl.
| E02F 3/815 | (2006.01) |
| E02F 9/28 | (2006.01) |
| A01B 15/04 | (2006.01) |
| E01H 5/06 | (2006.01) |
| E02F 3/76 | (2006.01) |

(52) U.S. Cl.
CPC ............ *E02F 3/8152* (2013.01); *A01B 15/04* (2013.01); *E01H 5/061* (2013.01); *E02F 9/2883* (2013.01); *E02F 3/7636* (2013.01)

(58) Field of Classification Search
CPC ...... A01B 31/00; E02F 3/8152; E02F 3/8157; E02F 9/285; E02F 9/2825; E02F 9/2833; E02F 9/2841; E02F 3/8155; E02F 9/26; E02F 9/2883; E02F 3/7636; E01H 5/061; E01H 5/12; E21C 35/183; E21C 35/1933; E21C 23/082; E21C 35/18
USPC ..... 37/244, 266, 452–460; 172/701.1–701.3, 172/719, 747, 772.5, 777; 299/36.1, 111
See application file for complete search history.

(56) References Cited

U.S. PATENT DOCUMENTS

| 3,934,654 | A | * | 1/1976 | Stephenson | ............. | E01H 5/061 |
| | | | | | | 172/701.3 |
| 4,584,020 | A | | 4/1986 | Sandvik | | |
| 4,753,299 | A | * | 6/1988 | Meyers | ................ | E02F 9/2825 |
| | | | | | | 172/701.3 |
| 4,883,129 | A | * | 11/1989 | Lonn | ....................... | E02F 9/285 |
| | | | | | | 172/701.3 |
| 5,054,217 | A | * | 10/1991 | Nilsson | ................... | E01H 5/061 |
| | | | | | | 172/701.1 |
| 5,081,774 | A | | 1/1992 | Sumitomo | | |
| 5,224,555 | A | * | 7/1993 | Bain | ..................... | E02F 3/8152 |
| | | | | | | 172/701.3 |
| 5,813,474 | A | * | 9/1998 | Manway | ................ | A01B 15/06 |
| | | | | | | 172/701.3 |
| 6,799,388 | B2 | * | 10/2004 | Weaver | ................. | E02F 3/8157 |
| | | | | | | 37/446 |
| 6,854,527 | B2 | * | 2/2005 | Manway | ............... | E02F 3/8152 |
| | | | | | | 172/701.1 |

(Continued)

FOREIGN PATENT DOCUMENTS

| CA | 2479905 A1 | 3/2006 |
| KR | 20160110201 A | 9/2016 |

OTHER PUBLICATIONS

International Search Report dated Mar. 20, 2018.

*Primary Examiner* — Robert E Pezzuto
(74) *Attorney, Agent, or Firm* — Law Office of Kurt J. Fugman LLC

(57) ABSTRACT

A blade for use with a grading machine comprises an attachment portion, a working portion including a plurality of teeth, each tooth defining a bore, and a plurality of wear resistant inserts retained in the bores of the teeth.

20 Claims, 5 Drawing Sheets

(56) References Cited

U.S. PATENT DOCUMENTS

| | | | |
|---|---|---|---|
| 7,665,234 B2 * | 2/2010 | Diehl | E02F 3/8157 |
| | | | 172/701.3 |
| 8,443,911 B2 * | 5/2013 | Tutschek | A01B 31/00 |
| | | | 172/701.3 |
| 8,490,711 B2 | 7/2013 | Polumati | |
| 8,763,282 B2 | 7/2014 | Metalogenia | |
| 9,428,874 B2 * | 8/2016 | Winter | E01H 5/061 |
| 9,562,342 B2 * | 2/2017 | Winter | E02F 3/8157 |
| 2009/0145616 A1 | 6/2009 | Buxton | |

* cited by examiner

SERRATED CUTTING EDGE WITH CERAMIC INSERT

TECHNICAL FIELD

The present disclosure relates to cast serrated cutting edges used by motor graders or other similar equipment. More specifically, the present disclosure relates to such serrated cutting edges that employ an insert that improves the wear characteristics of such cutting edges.

BACKGROUND

Machines such as motor graders employ a long blade that is used to level work surfaces during the grading phase of a construction project or the like. These blades often encounter abrasive material such as rocks, dirt, etc. that can degrade the working edge, making such blades ineffective for their intended purpose. Some blades have a serrated cutting edge meaning that the edge is not continuously flat but undulates up and down, forming teeth. A drawback to such blades is that the teeth may be more easily worn than is desired. In harsh environments, such blades may be rendered dull, with the teeth having been essentially removed, after 100-200 hours of operation. Necessitating their replacement. Serrated cutting edges are sometimes provided to improve penetration, etc.

One proposed solution to this problem is disclosed in U.S. Pat. No. 5,813,474 to Manway. This patent discloses a plow blade that is straight across, lacking a serrated cutting edge that defines teeth, and that uses a plurality of blade inserts made from carbide or the like, intended to prolong the useful life of the plow blade.

However, the design disclosed in Manway suffers from several deficiencies. First, the inserts do not last long enough to prolong the useful life of the blade as much as desirable. Second, this patent does not teach one skilled in the art how to effectively prolong a blade having a serrated cutting edge. Third, Manway fails to teach a sufficiently robust method for attaching the insert to the blade. Accordingly, there exists a need for an improved blade reinforcement technique than has been yet been devised.

SUMMARY OF THE DISCLOSURE

A blade for use with a grading machine is provided, comprising a rectangular attachment portion defining a width, a height perpendicular to the width, and a thickness perpendicular to the width and height, wherein the width exceeds the height, and the height exceeds the thickness, and a working portion extending from the attachment portion along a direction that is parallel to the height of the attachment portion toward a free end, defining a height of the working portion. The working portion contains a wear resistant insert defining an insert height parallel to the working portion height, and a ratio of the insert height to the working portion height ranges from 0.75 to 0.9.

A blade for use with a grading machine is provided, comprising a rectangular attachment portion defining a width, a height perpendicular to the width, and a thickness perpendicular to the width and height, wherein the width exceeds the height, and the height exceeds the thickness, and a working portion extending from the attachment portion along a direction that is parallel to the height of the attachment portion toward a free end, the free end defining a serrated cutting edge, forming a plurality of teeth. Each tooth of the plurality of teeth defines a tooth height parallel to the height of the attachment portion, and a cross-sectional shape in a plane that is perpendicular to the tooth height having a rectangular profile, each tooth further defining a centroid and a circular bore with a volume, and the centroid is disposed within the volume of the bore.

A blade for use with a grading machine is provided, comprising a rectangular attachment portion defining a width, a height perpendicular to the width, and a thickness perpendicular to the width and height, wherein the width exceeds the height, and the height exceeds the thickness, and a working portion extending from the attachment portion along a direction that is parallel to the height of the attachment portion toward a free end, the free end defining a serrated cutting edge, forming a plurality of teeth. Each tooth of the plurality of teeth defines a tooth height parallel to the height of the attachment portion, and a cross-sectional shape in a plane that is perpendicular to the tooth height having a rectangular profile, each tooth further defining a centroid and a circular bore with a volume, and the circular bore is at least partially defined by a drill point bottom surface.

DETAILED DESCRIPTION

Figure 1:
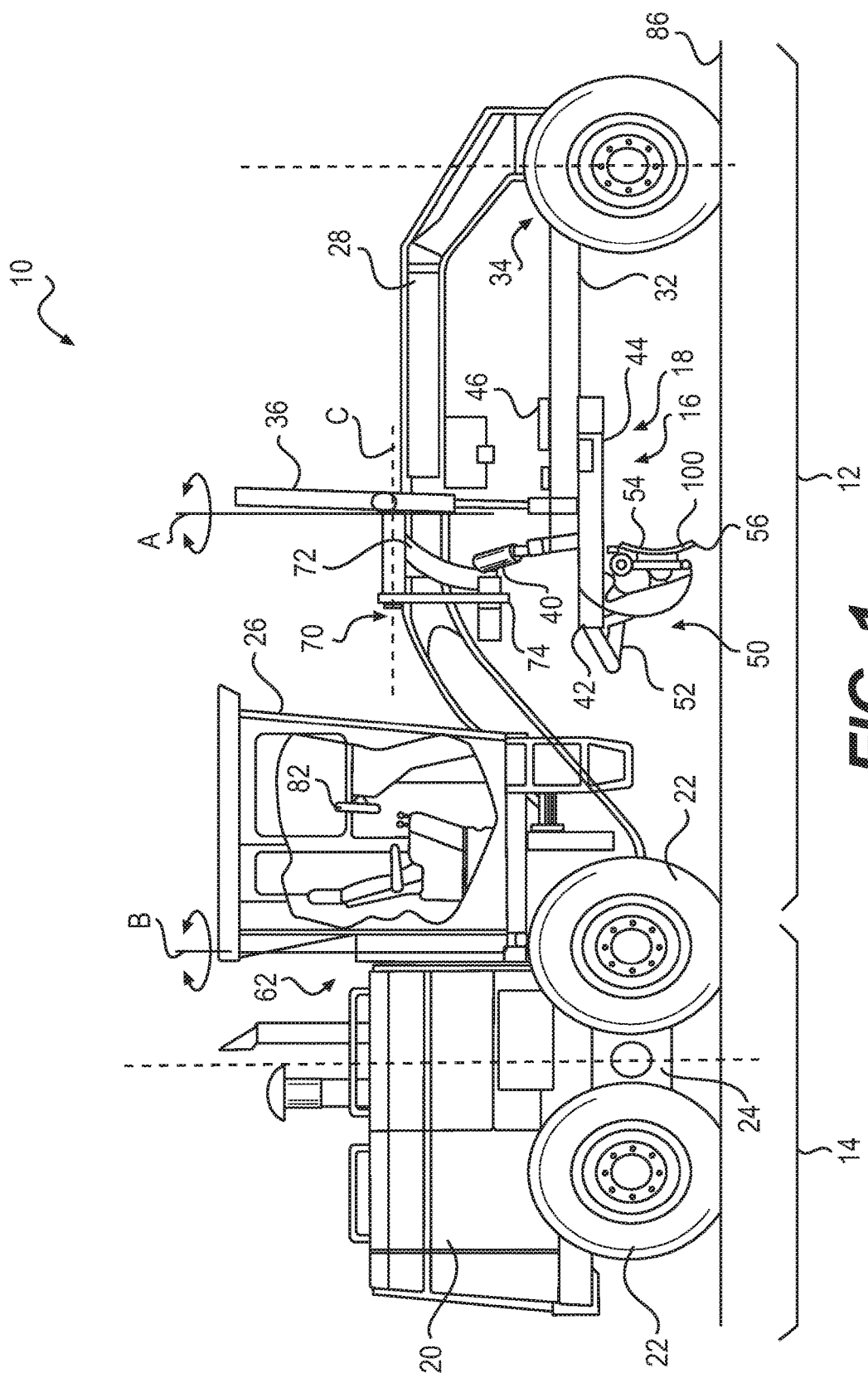
FIG. 1 is a side view of a motor grader that may employ a blade with wear resistant inserts according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A blade with a serrated cutting edge, forming a plurality of teeth with wear resistant inserts disposed herein will now be described with reference to several aspects. In some embodiments, a blade exhibiting greater longevity will be described. In other embodiments, an optimized placement of the wear resistant insert in the tooth will be discussed. In yet further embodiments, a suitable construction for drilling out a bore in the tooth of a blade, inserting a wear resistant insert therein and retaining the insert using an adhesive will be explained. For any of the embodiments discussed herein, the configuration of the cutting edge may be varied as needed or desired. For example, serrated cutting edges may be provided or non-serrated cutting edges may be provided. Furthermore, the teeth, inserts or other portions of the wear zone (also referred to as the working portion) or attachment zone (also referred to as the attachment portion) may be rectangular or be configured in any suitable manner as needed or desired. Other examples of geometry includes rolled plate edges, etc.

First, a machine will now be described to give the reader the proper context for understanding how various embodiments of the present disclosure are used to level or grade a work surface. It is to be understood that this description is given as exemplary and not in any limiting sense. Any embodiment of an apparatus or method described herein may be used in conjunction with any suitable machine.

FIG. 1 is a side view of a motor grader in accordance with one embodiment of the present disclosure. The motor grader 10 includes a front frame 12, rear frame 14, and a work implement 16, e.g., a blade assembly 18, also referred to as a drawbar-circle-moldboard assembly (DCM). The rear frame 14 includes a power source (not shown), contained within a rear compartment 20, that is operatively coupled through a transmission (not shown) to rear traction devices or wheels 22 for primary machine propulsion.

As shown, the rear wheels 22 are operatively supported on tandems 24 which are pivotally connected to the machine between the rear wheels 22 on each side of the motor grader 10. The power source may be, for example, a diesel engine, a gasoline engine, a natural gas engine, or any other engine known in the art. The power source may also be an electric motor linked to a fuel cell, capacitive storage device, battery, or another source of power known in the art. The transmission may be a mechanical transmission, hydraulic transmission, or any other transmission type known in the art. The transmission may be operable to produce multiple output speed ratios (or a continuously variable speed ratio) between the power source and driven traction devices.

The front frame 12 supports an operator station 26 that contains operator controls 82, along with a variety of displays or indicators used to convey information to the operator, for primary operation of the motor grader 10. The front frame 12 also includes a beam 28 that supports the blade assembly 18 and which is employed to move the blade 100 to a wide range of positions relative to the motor grader 10. The blade assembly 18 includes a drawbar 32 pivotally mounted to a first end 34 of the beam 28 via a ball joint (not shown). The position of the drawbar 32 is controlled by three hydraulic cylinders: a right lift cylinder 36 and left lift cylinder (not shown) that control vertical movement, and a center shift cylinder 40 that controls horizontal movement. The right and left lift cylinders are connected to a coupling 70 that includes lift arms 72 pivotally connected to the beam 28 for rotation about axis C. A bottom portion of the coupling 70 has an adjustable length horizontal member 74 that is connected to the center shift cylinder 40.

The drawbar 32 includes a large, flat plate, commonly referred to as a yoke plate 42. Beneath the yoke plate 42 is a circular gear arrangement and mount, commonly referred to as the circle 44. The circle 44 is rotated by, for example, a hydraulic motor referred to as the circle drive 46. Rotation of the circle 44 by the circle drive 46 rotates the attached blade 100 about an axis A perpendicular to a plane of the drawbar yoke plate 42. The blade cutting angle is defined as the angle of the blade 100 relative to a longitudinal axis of the front frame 12. For example, at a zero degree blade cutting angle, the blade 100 is aligned at a right angle to the longitudinal axis of the front frame 12 and beam 28.

The blade 100 is also mounted to the circle 44 via a pivot assembly 50 that allows for tilting of the blade 100 relative to the circle 44. A blade tip cylinder 52 is used to tilt the blade 100 forward or rearward. In other words, the blade tip cylinder 52 is used to tip or tilt a top edge 54 relative to the bottom cutting edge 56 of the blade 30, which is commonly referred to as blade tip. The blade 100 is also mounted to a sliding joint associated with the circle 44 that allows the blade 100 to be slid or shifted from side-to-side relative to the circle 44. The side-to-side shift is commonly referred to as blade side shift. A side shift cylinder (not shown) is used to control the blade side shift. The placement of the blade 100 allows a work surface 86 such as soil, dirt, rocks, etc. to be leveled or graded as desired. The motor grader 10 includes an articulation joint 62 that pivotally connects front frame 12 and rear frame 14, allowing for complex movement of the motor grader, and the blade.

U.S. Pat. No. 8,490,711 to Polumati illustrates another motor grader with fewer axes of movement than that just described with respect to FIG. 1. It is contemplated that such a motor grader could also employ a blade according to various embodiments of the present disclosure, etc.

Figure 2:
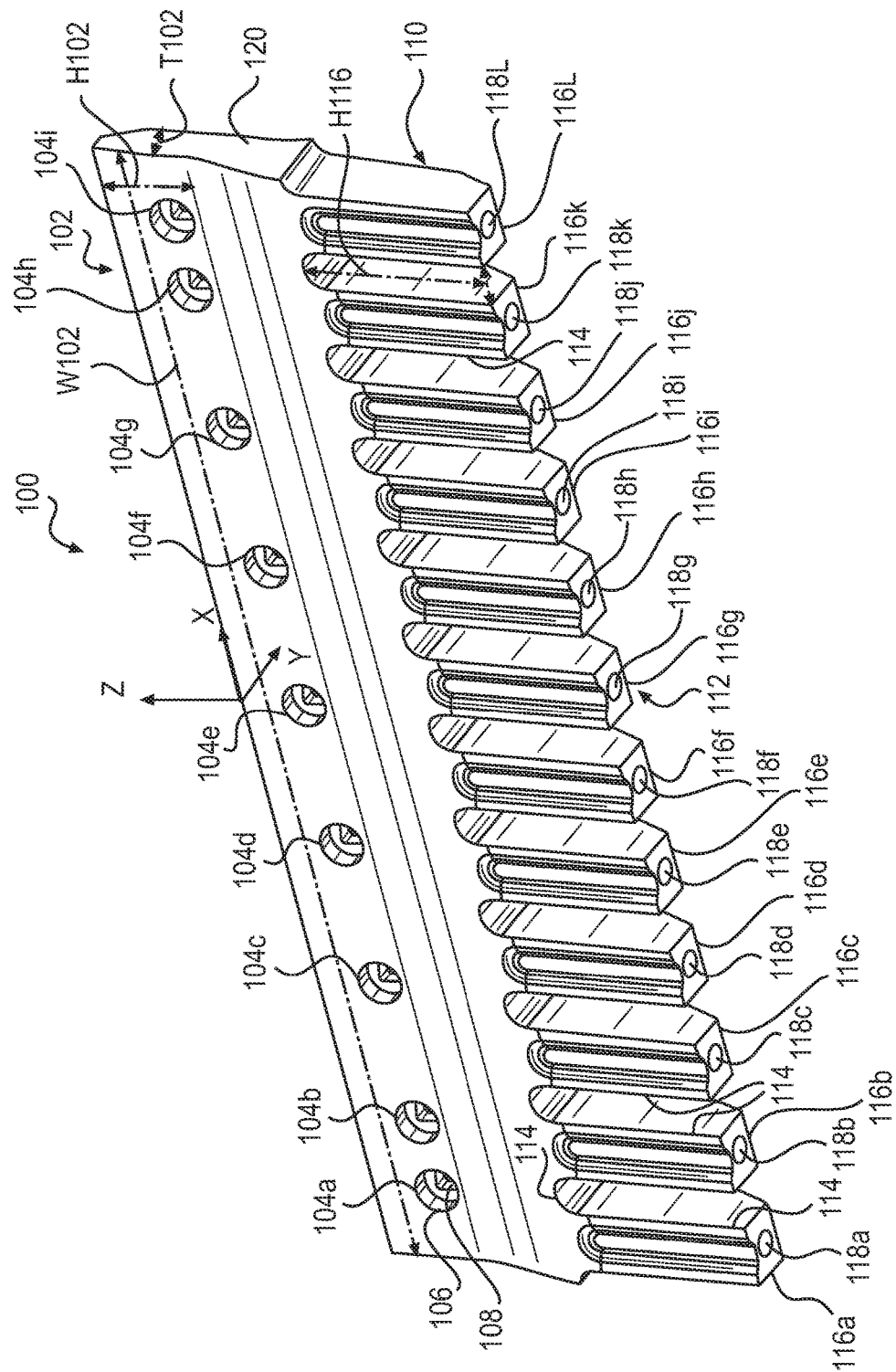
FIG. 2 is a perspective view of a blade with wear resistant inserts according to an embodiment of the present disclosure shown in isolation from a machine.

Turning now to FIG. 2, a blade 100 having a suitable working life compatible to be used with a grading machine, such as that shown in FIG. 1, is illustrated. The blade 100 may comprise a rectangular attachment portion 102 defining a width W102, a height H102 perpendicular to the width W102, and a thickness T102 perpendicular to the width W102 and height H102, wherein the width W102 exceeds the height H102, and the height H102 exceeds the thickness T102. A Cartesian coordinate system is provided for additional clarity in FIG. 2 and the width W102 is parallel to the X axis, the height H102 is parallel to the Z axis, and the thickness T102 is parallel to the Y axis. Attachment apertures 104 are provided for attaching the blade 100 to the mounting interface of the machine. These apertures 104 are counterbores 106 with rectangular shaped thru-holes 108 that mate with mounting bolts (not shown), preventing their rotation as the threaded ends of the bolts are attached using a nut on the other side of the mounting interface of the machine. Other configurations of apertures 104 are possible as well as other devices and methods for attaching the blade to the machine.

The blade 100 further comprises a working portion 110 extending from the attachment portion 102 along a direction that is parallel to the height of the attachment portion 102 (negative Z direction) toward a free end 112, the free end 112 defining a serrated cutting edge 114, forming a plurality of teeth 116. As shown, each tooth 116 of the plurality of teeth defines a tooth height H116 that is parallel to the height of the attachment portion (Z direction) and contains a wear resistant insert 118 defining an insert height H118 (best seen in FIG. 4) parallel to the tooth height (Z direction), and a ratio of the insert height H118 to the tooth height H116 ranges from 0.75 to 0.9. In other cases, the insert may extend the full length of the tooth height. This ratio may be varied as needed or desired. For this embodiment, the thickness of the working portion 110 immediately adjacent the attachment portion (102) flares (see feature 120), until the desired thickness T110 of the working portion 110 is attained. This geometry may not be present or may be different in other embodiments. Put another way, the tooth height may be representative of the height or other dimension of the wear zone. As such, the ratio of the insert height to the tooth height may be alternatively expressed as the ratio of a major dimension of the insert to a major dimension of the wear portion, etc.

Also, each tooth 116 of the plurality of teeth may define a bore 122 having a bore depth D122 (best seen in FIG. 3) parallel to the tooth height (Z direction), configured to receive the insert 118. The ratio of the insert height H118 to the bore depth D122 may range from 0.8 to 1.0. This ratio may be varied as needed or desired. In some embodiments, the ratio may be approximately 0.86. In some embodiments, H118 may be six inches and D122 may be seven inches.

Figure 3:
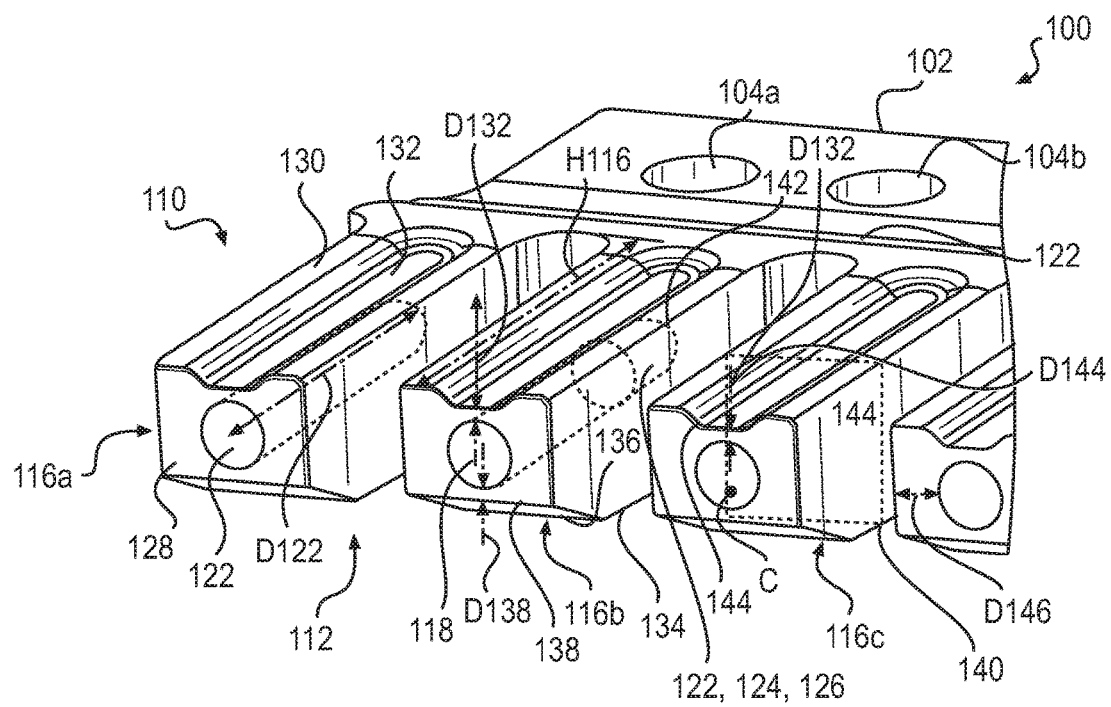
FIG. 3 is an enlarged perspective view of a portion of the blade of FIG. 2 with the inserts removed, showing the bores configured to receive the wear resistant inserts more clearly.
Figure 6:
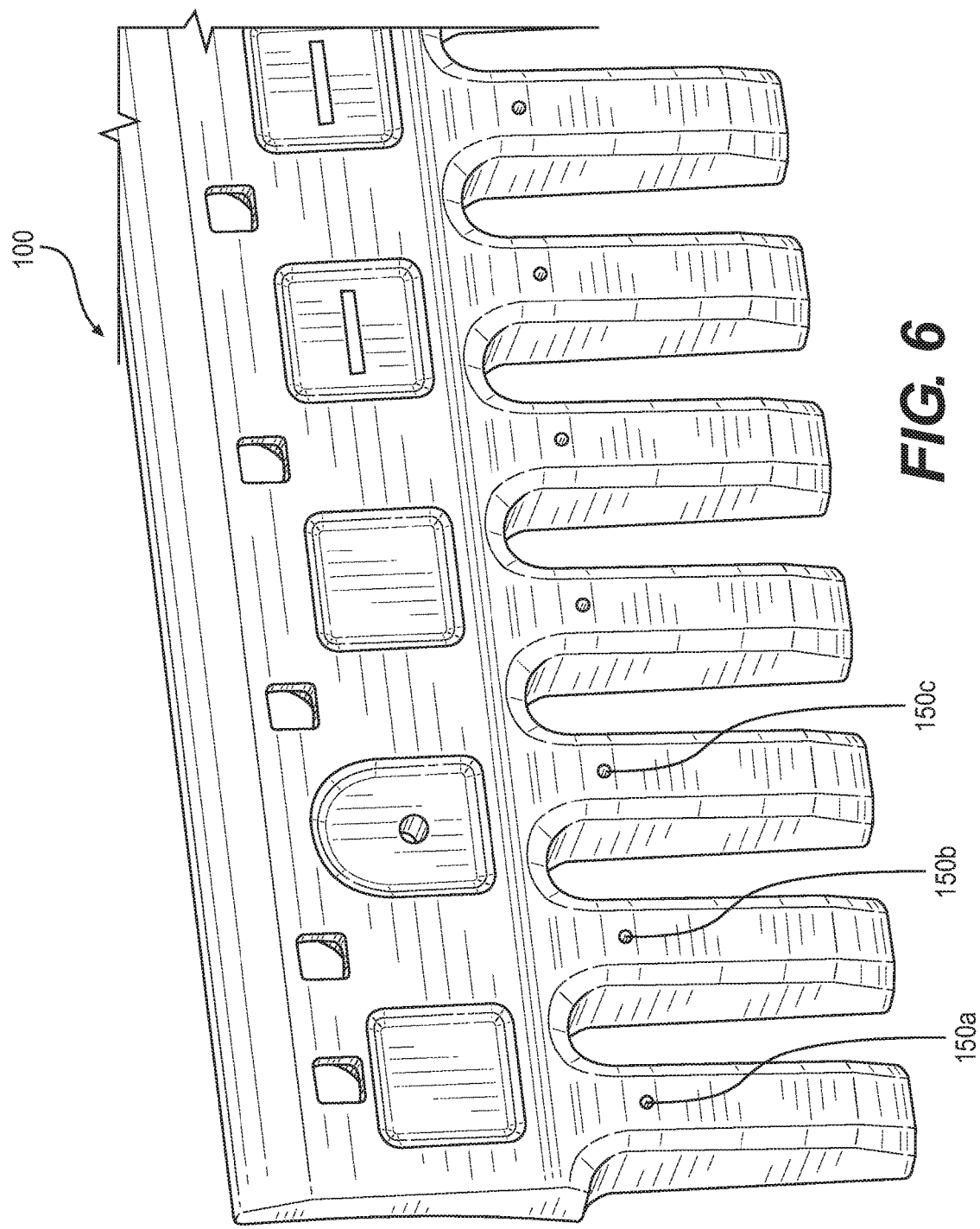
FIG. 6 is a perspective view of an embodiment according to the present disclosure that discloses cross-bores that facilitate the assembly of the inserts into the blade and injection of an epoxy into the void formed between the insert and the bottom of the hole configured to receive the insert.

As also best seen in FIG. 3, when the ratio of the insert height H118 to the bore depth D122 for each tooth 116 is less than 1.0, a void 124 is formed between the insert 118 and the bottom of the bore 122 and adhesive 126 may disposed therein for retaining the insert in the bore. This version of the bore 122 has a drill point bottom surface 142. In other embodiments, the bore may have a flat bottom and the insert may have been cast into the tooth, holding the insert in place. FIG. 6 is a perspective view of an embodiment according to the present disclosure that discloses cross-bores that facilitate the assembly of the inserts into the blade and injection of an epoxy into the void formed between the insert and the bottom of the hole configured to receive the insert. As can be imagined, as the insert is inserted into the hole, air pressure may increase making it difficult to keep the insert in the hole. The cross-bore 150 allows air to escape as this assembly process takes place. After the insert is inserted into the hole, epoxy or other material suitable to support the insert in use may be injected into the cross-bore 150, filling the void between the insert and the blade body. This may provide enough support for the insert so that the insert will not be prone to crack in use, etc.

Still referring to FIG. 3, each tooth 116 of the plurality of teeth includes a bottom surface 128 at the free end 112 and a front surface 130 that defines a recess 132 extending from the bottom surface 128 along a majority of the height H116 of the tooth 116, and the minimum distance D132 from the recess 132 to the wear resistant insert 118 is 6.2 mm. Also, each tooth 116 of the plurality of teeth may include a back surface 134 facing in the opposite direction from the front surface 130 and a trailing chamfered surface 136 extending from the bottom surface 128 to the back surface 134, the trailing chamfered surface 136 forming an intersection 138 with the bottom surface 128, and the minimum distance D138 from the intersection 138 to the wear resistant insert is 6.2 mm. These distances may be varied as needed or desired. For example, a range of 5-10 mm is contemplated.

As shown in FIGS. 2 and 3, the blade 100 may include a plurality of teeth 116 wherein each tooth includes a bottom surface 128 at the free end 112 and the wear resistant insert 118 is flush to recessed with the bottom surface 128. In embodiments where the insert is proud of the bottom surface 128, the amount the insert protrudes from the bottom surface is not used to calculate any of the ratios discussed herein. The blade may comprise a cast iron or steel material and the insert may comprise a ceramic material. Other suitable materials may be used for the blade and the insert. For example, the insert may be made from any suitable wear resistant material such as white iron, tungsten carbide, single crystal sapphire, etc. Also, the configuration the wear portion, whether a plurality of teeth or provided or a single wear member extending the full length of the blade is provided, etc., may be altered as needed or desired.

Other embodiments of a blade according to another aspect of the present disclosure may be described as follows. Focusing on FIG. 3, each tooth 116 of the plurality of teeth of the blade 100 may define a tooth height H116 parallel to the height of the attachment portion 102 (Z direction shown in FIG. 1), and a cross-sectional shape in a plane that is perpendicular to the tooth height 116 having a rectangular profile 140, each tooth 116 further defining a centroid C and a circular bore 122 with a volume, and the centroid C is disposed within the volume of the bore 122. As shown, centroid C is shown near the opening of the bore for the ease of illustration; however, it is to be understood that the centroid C would actually be located spaced a distance approximately two thirds along the height of the tooth in the Z direction from what is actually shown. Also, the centroid C may be slightly offset from the circular center of the bore but still within the diameter of the bore. This placement of the insert in the tooth may help the tooth effectively resist wear regardless of the orientation or angle of the blade relative to a work surface.

Each tooth 116 of the plurality of teeth may include a bottom surface 128 at the free end 112, the bottom surface 128 being defined by a plurality of boundary edges 144, and the minimum distance D144 between a boundary edge 144 and the bore 122 may be 5-7 mm. A thicker minimum dimension 146 may be provided from the bore to a side surface that may range from 20 to 25 mm. The diameter of the hole and insert may range from 0.75 to 1.5 inches. Any of these dimensions may be varied as needed or desired.

In some embodiments, the rectangular profile is a square profile for each tooth. Also, a plurality of wear resistant inserts may be provided made from alumina or silicon carbide, etc. As alluded to earlier, the bore 122 may be at least partially defined by a drill point bottom surface 142. Again, other profiles such as circular may be employed.

Figure 4:
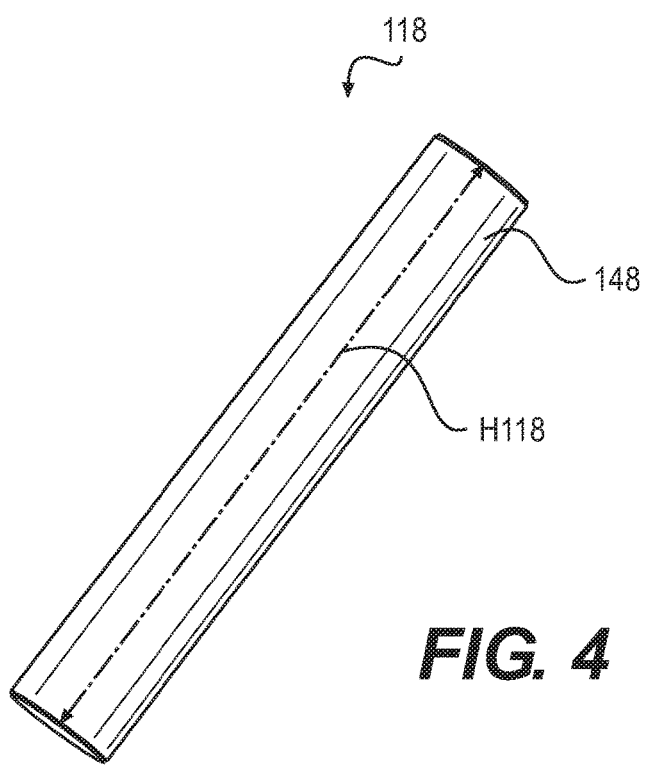
FIG. 4 is a perspective view of a wear resistant insert configured to be inserted into or cast into a blade such as that shown in FIG. 2 or 3.

Yet further embodiments of a blade 100 according to another aspect of the present disclosure may be described as follows looking at FIGS. 3 and 4, focusing on the assembly of the inserts 118 into the blade 100. Each tooth 116 may define a tooth height H116 parallel to the height H102 of the attachment portion 102 (Z direction), and a cross-sectional shape in a plane that is perpendicular to the tooth height having a rectangular profile 140, each tooth further defining a centroid C and a circular bore 122 with a volume, and the circular bore 122 is at least partially defined by a drill point bottom surface 142.

In many embodiments, the centroid C of each tooth 116 is disposed in the volume of the bore 122 of each tooth 116. A wear resistant insert 118 may be disposed in the bore 122 of each tooth 116 having an insert height H118 and each tooth may define a bore depth D122 parallel to the tooth height H116 and the depth D122 may exceed the insert height H118, forming a void 124 with adhesive or epoxy 126 disposed therein.

The insert 118 may define a cylindrical circumference 148 that defines a clearance with the diameter of the circular bore 122 that ranges from 0-2 mm. In other words, the difference in the radial dimension of the insert 118 and the radial dimension of the bore 122 may range from 0 to 2 mm. Also, the ratio of the bore depth D122 to the tooth height H116 may range from 0.8 to 1.0 as mentioned previously herein. In some embodiments, the difference between insert height H118 to the bore depth D122 ranges from 0.5 to 1.5 inches.

Again, it should be noted that any of these dimensions and ratios may be varied as desired or needed and that differently configured teeth and inserts may be used in conjunction with the same blade if so desired or needed.

INDUSTRIAL APPLICABILITY

In practice, a wear resistant insert and adhesive may be manufactured, bought, or sold to retrofit an existing blade in the field to improve the blade's useful life. In other situations, the blade may be sold according to any embodiment described herein already with a wear resistant insert in the blade.

Figure 5:
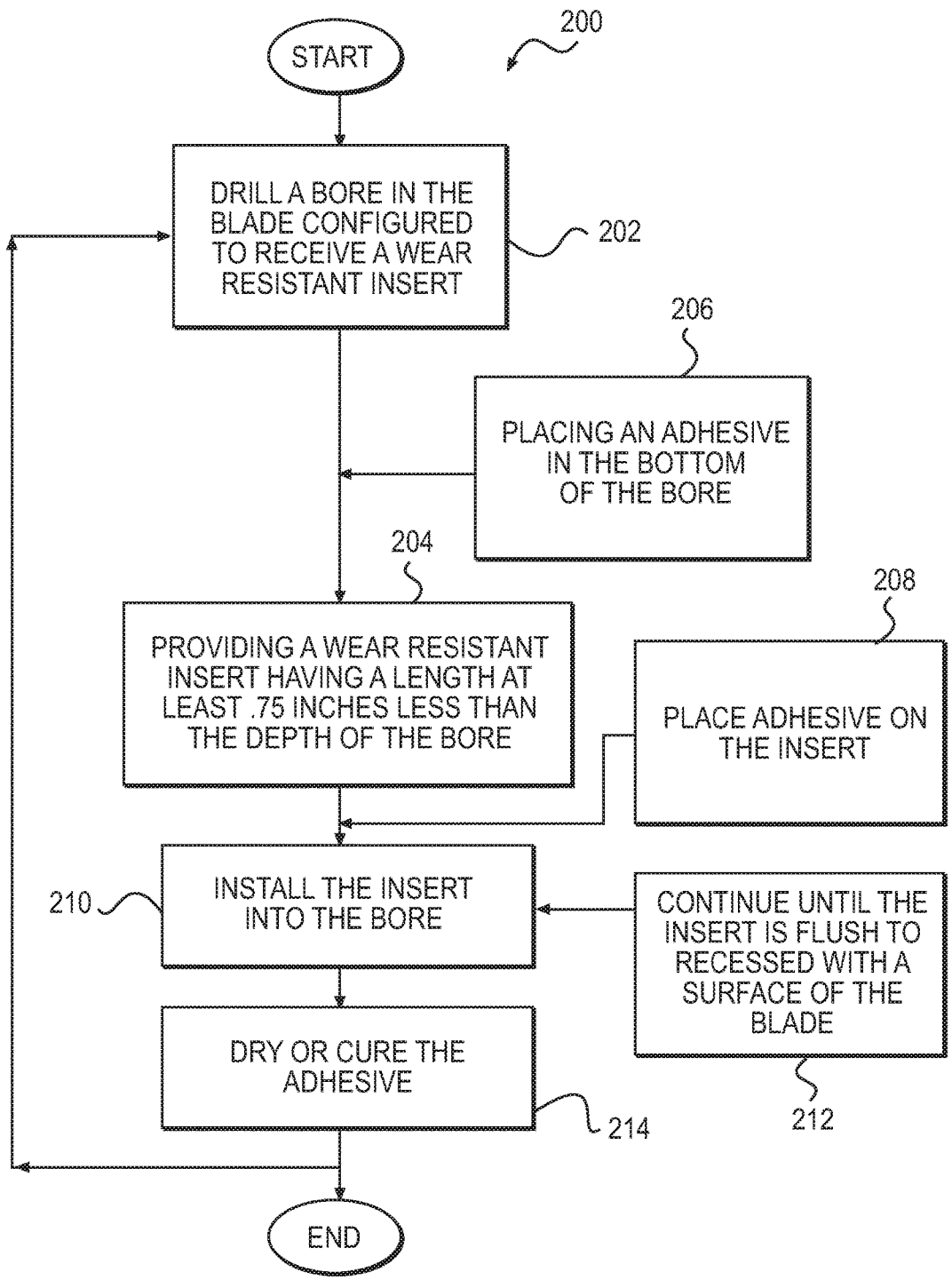
FIG. 5 is a flowchart depicting the steps of manufacturing a blade with wear resistant inserts according to an embodiment of the present disclosure.

In either case, the following method 200 may construct the blade. FIG. 5 illustrates the steps of this method. First, a bore may be drilled in the blade, configured to receive a wear resistant insert (step 202). Second, a wear resistant insert may be provided that has a length that is at least 0.75" less than the depth of the bore (step 204). Third, an adhesive may be placed in the bottom of the bore before the insert is inserted into the bore (step 206). Fourth, some adhesive may be applied to the insert (step 208). Next, the insert may be installed into the bore (step 210). This installation may be continued until the insert is flush to recessed with a surface of the blade (212). Next, the adhesive is dried or cured (214). Of course, this process may be performed as many times as needed or desired until the desired number of inserted have been retained in the blade. Then, the blade may be used to grade or level a work surface, etc.

In other embodiments, the insert may be cast into place in the blade.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A blade for use with a grading ma blade comprising:
    a rectangular attachment portion defining a width, a height perpendicular to the width, and a thickness perpendicular to the width and height, wherein the width exceeds the height, and the height exceeds the thickness; and
    a working portion extending from the attachment portion along a direction that is parallel to the height of the attachment portion toward a free end, defining a height of the working portion, wherein:
        the working portion defines a bore having a bore depth and contains a wear resistant insert defining an insert height parallel to the working portion height, and a ratio of the insert height to the working portion height ranges from 0.75 to 0.9 and the bore is configured to receive the wear resistant insert and the ratio of the insert height to the bore depth is less than 1.0. forming a void between the insert and the bottom of the bore with adhesive or epoxy disposed therein.

2. The blade of claim 1 wherein the free end defines a serrated cutting edge, forming a plurality of teeth defining a tooth height and each tooth of the plurality of teeth defines a bore having a bore depth parallel to the tooth height, configured to receive the insert, and the ratio of the insert height to the bore depth ranges from 0.8 to 1.0.

3. The blade of claim 2 wherein each tooth defines a cross-bore that is in communication with the bore receiving the wear resistant insert, the cross-bore extending to the exterior of the tooth.

4. The blade of claim 1 wherein the free end defines a serrated cutting edge, forming a plurality of teeth defining a tooth height and each tooth of the plurality of teeth includes a bottom surface at the free end and a front surface that defines a recess extending from the bottom surface along a majority of the height of the tooth, and the minimum distance from the recess to the wear resistant insert is 5 to 10 mm.

5. The blade of claim 4 wherein each tooth of the plurality of teeth includes a back surface facing in the opposite direction from the front surface and a trailing chamfered surface extending from the bottom surface to the back surface, the trailing chamfered surface forming an intersection with the bottom surface, and the minimum distance from the intersection to the wear resistant insert is 5 to 10 mm.

6. The blade of claim 1 wherein the free end defines a serrated cutting edge, forming a plurality of teeth and each tooth of the plurality of teeth includes a bottom surface at the free end and the wear resistant insert is flush to recessed with the bottom surface.

7. The blade of claim 1 wherein the blade comprises a steel material and the insert comprises a ceramic material.

8. A blade for use with a grading machine, the blade comprising:
    a rectangular attachment portion defining a width, a height perpendicular to the width, and a thickness perpendicular to the width and height, wherein the width exceeds the height, and the height exceeds the thickness; and a working portion extending from the attachment portion along a direction that is parallel to the height of the attachment portion toward a free end, the free end defining a serrated cutting edge, forming a plurality of teeth, wherein:

each tooth of the plurality of teeth defines a tooth height parallel to the height of the attachment portion, and a cross-sectional shape in a plane that is perpendicular to the tooth height having a rectangular profile, each tooth further defining a centroid and a circular bore with a volume, and the centroid is disposed within the volume of the bore, each tooth further defining a cross-bore extending from the exterior of the tooth to the circular bore.

9. The blade of claim 8, wherein each tooth of the plurality of teeth includes a bottom surface at the free end, the bottom surface being defined by a plurality of boundary edges, and the minimum distance between a boundary edge and the bore is 5 to 7mm.

10. The blade of claim 8 wherein the rectangular profile is a square profile for each tooth.

11. The blade of claim 8 further comprising a plurality of wear resistant inserts including alumina.

12. The blade of claim 8 further comprising a plurality of wear resistant inserts including silicon carbide.

13. The blade of claim 8 wherein the bore is at least partially defined by a drill point bottom surface.

14. A blade for use with a grading machine, the blade comprising:

a rectangular attachment portion defining a width, a height perpendicular to the width, and a thickness perpendicular to the width and height, wherein the width exceeds the height, and the height exceeds the thickness; and a working portion extending from the attachment portion along a direction that is parallel to the height of the attachment portion toward a free end, the free end defining a serrated cutting edge, forming a plurality of teeth, wherein:

each tooth of the plurality of teeth defines a tooth height parallel to the height of the attachment portion, and a cross-sectional shape in a plane that is perpendicular to the tooth height having a rectangular profile, each tooth further defining a centroid and a circular bore with a volume, and the circular bore is at least partially defined by a drill point bottom surface, each tooth further defining a cross-bore extending from the exterior of the tooth to the circular bore.

15. The blade of claim 14 herein the centroid of each tooth is disposed in the volume of the bore of each tooth.

16. The blade of claim 14 further comprising a wear resistant insert disposed in the bore of each tooth having an insert height and wherein each tooth defines a bore depth parallel to the tooth height and the depth exceeds the insert height, forming a void with adhesive or epoxy disposed therein.

17. The blade of claim 16 wherein the insert defines a cylindrical circumference that defines a clearance with the diameter of the circular bore that ranges from 0 to 2 mm.

18. The blade of claim 16 wherein the ratio of the bore depth to the tooth height ranges from 0.8 to 1.0.

19. The blade of claim 16 wherein the blade comprises a steel material.

20. The blade of claim 16, wherein the difference between the insert height and the bore depth ranges from 0.5 to 1.5 inches.

* * * * *